April 17, 1956  S. BECKWITH  2,742,583
DYNAMOELECTRIC MACHINE WITH GAS JET COOLED
LEAD CONDUCTORS AND TERMINAL BUSHINGS
Filed May 20, 1954  3 Sheets-Sheet 2
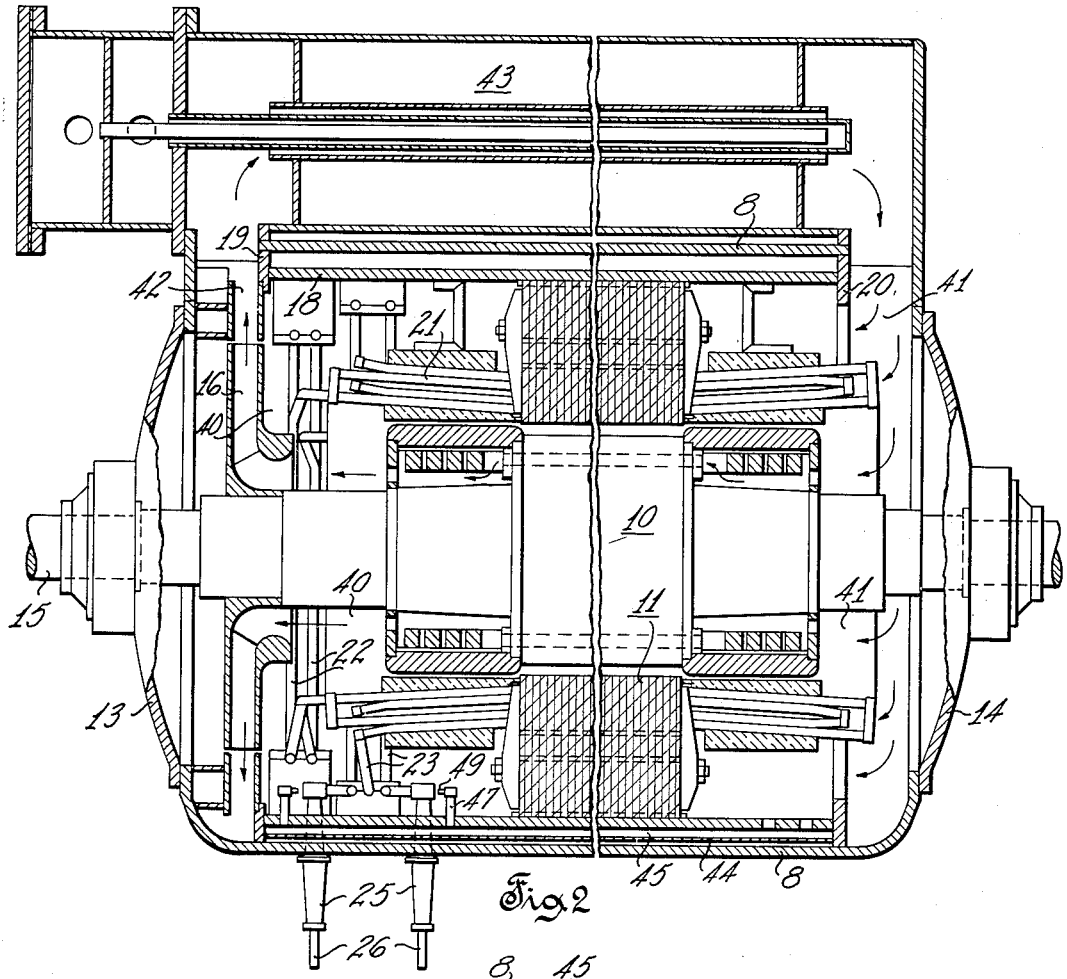
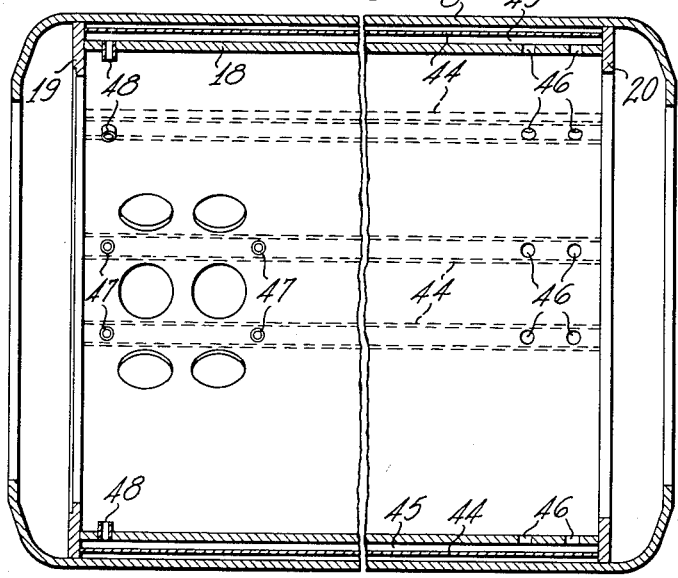
Inventor
Sterling Beckwith
by T. Lloyd LaFave
Attorney April 17, 1956 S. BECKWITH 2,742,583
DYNAMOELECTRIC MACHINE WITH GAS JET COOLED
LEAD CONDUCTORS AND TERMINAL BUSHINGS
Filed May 20, 1954 3 Sheets-Sheet 3

Inventor
Sterling Beckwith
by T. Lloyd LeFave
Attorney

United States Patent Office 2,742,583
Patented Apr. 17, 1956

2,742,583

DYNAMOELECTRIC MACHINE WITH GAS JET COOLED LEAD CONDUCTORS AND TERMINAL BUSHINGS

Sterling Beckwith, Lake Forest, Ill., assignor to Allis-Chalmers Manufacturing Company, Milwaukee, Wis.

Application May 20, 1954, Serial No. 431,061

11 Claims. (Cl. 310—57)

This invention relates to a gas cooled dynamoelectric machine having an armature winding whose lead conductors and terminals are arranged for improved cooling by the ventilating gas of the machine.

In recent development of gas cooled dynamoelectric machines, particularly hydrogen cooled turbogenerators, the current capacity of the terminal bushings and of the lead conductors is a limiting factor to further increase in the power rating of the machine.

It is therefore an object of the present invention to provide a gas cooled electric machine with a new and improved arrangement for cooling the lead conductors and terminals with the same gas cooling the machine.

Another object of the invention is to provide a new and improved arrangement for cooling lead conductors and interphase conductors of an armature winding of a dynamoelectric machine.

Another object of the invention is to provide a dynamoelectric machine with lead conductors and terminals therefor cooled by jets of ventilating gas.

Other objects and advantages will be apparent to one skilled in the art from the following description taken with the accompanying drawings, in which:

Fig. 2 is a view in longitudinal cross section, taken along the line II—II of Fig. 1;

Fig. 3 is a view in longitudinal cross section on a reduced scale taken along the line III—III of Fig. 1 showing the frame for the dynamoelectric machine with the stator and rotor members removed;

Figure 1:
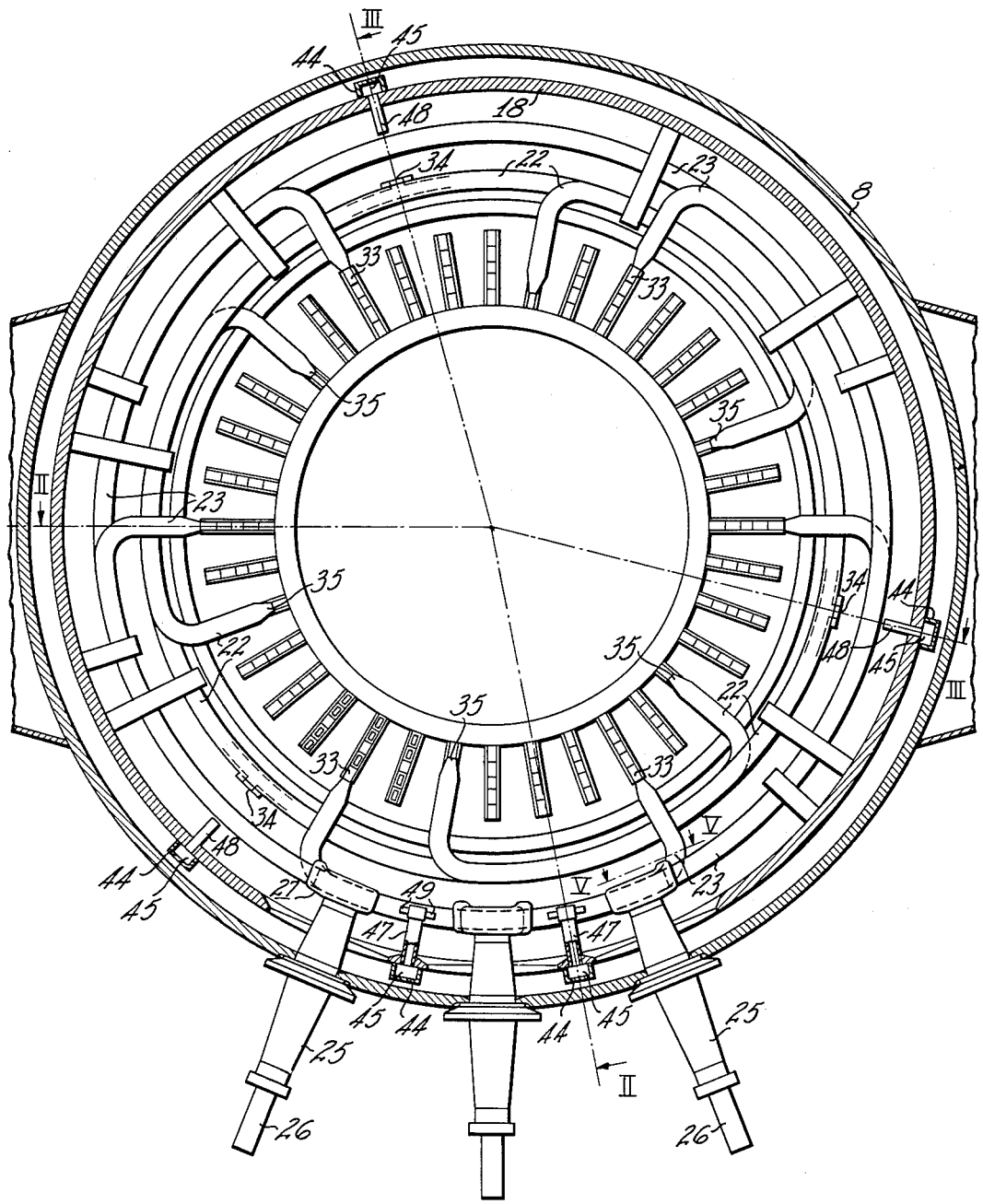
Fig. 1 is a transverse sectional view of a dynamoelectric machine embodying the present invention.

Referring to the drawings, the gas cooled dynamoelectric machine shown is a totally enclosed hydrogen cooled turbogenerator. The turbogenerator comprises a rotor 10 and a stator 11 enclosed by a housing normally fillable with a light density ventilating gas such as hydrogen. The gas may have any suitable pressure, such as one-half pound to several atmospheres gauge pressure when the gas is hydrogen. The housing includes an outer cylindrical wrapper 8 secured to end bells 13, 14 at opposite ends of the machine.

A rotatable shaft 15 extends through end bells 13, 14 provided with suitable shaft seals, not shown. Shaft 15 is supported in suitable bearings, not shown. A high pressure blower 16 preferably a centrifugal blower, is mounted on shaft 15 at one end of the machine for circulating ventilating gas through the machine.

Rotor 10 comprises a cylindrical, slotted magnetic core having a field winding whose conductors are preferably constructed and arranged in the slots to provide axial ventilating ducts bringing ventilating gas in direct contact with the metal of the conductors from one end of the rotor core to the other end thereof.

Stator 11 comprises a slotted laminated annular core supported by a frame 18 secured between rigid end rings 19, 20, which are integrally secured to opposite ends of outer wrapper 8. Frame 18 comprises an inner annular wrapper or tubular member spaced concentrically within outer wrapper 8. The stator core is suitably supported intermediate the ends of frame 18.

The stator core has an axially extending armature winding 21 whose conductors are preferably constructed and arranged therein to provide axial stator ducts through the stator core bringing ventilating gas substantially in direct contact with the conductors in passing from one end of the machine to the other end thereof. The air gap between the stator and rotor cores also provides a passage for the flow of ventilating gas from one end of the machine to the other.

The armature winding 21 is an alternating current winding comprising coils connected in a plurality of phase groups.

Conductors 22 interconnect phase groups of the coils, and lead conductors 23 connect the phases of stator winding 21 to suitable terminals outside of the machine housing. Such terminals include high voltage bushings 25 which extend through the outer wrapper 8. Each bushing comprises a current conducting stud 26 whose radially outer end forms an electric terminal for the armature winding, and whose radially inner end is connected to a lead conductor 23.

The bushings, the lead conductors, and the interphase conductors to provide increased current capacity therefor are constructed and arranged to receive an increased flow of ventilating gas in contact with the metal thereof. Each bushing includes a heat exchanger or radiator 27 comprising heat radiating fins 28 integral with or mounted in good heat conducting relation with the inner end of the bushing stud 26. As shown the fins 28 are closely spaced and are parallel with each other for receiving ventilating gas forced therebetween. A conductive housing 29 encloses the fins 28. Radiator housing 29 is mounted on stud 26 as in threaded engagement therewith. Radiator housing 29 is provided with apertures 30, 31 on opposite sides thereof aligned with the parallel fins. Aperture 30 serves as a gas inlet for the radiator housing and aperture 31 serves as a gas outlet for the radiator housing.

Each lead conductor 23 is constructed and arranged to provide longitudinal gas passages bringing the ventilating gas in direct contact with the conductor. As shown each lead conductor 23 is hollow to provide such a longitudinal gas passage therethrough between radiator inlet 30 and outlet 33 at opposite ends thereof. The gas inlet end of the lead conductor is secured in the outlet of the radiator housing. The gas outlet end of the lead conductor is secured to a phase coil with the gas outlet 33 adjacent thereto.

Figure 4:
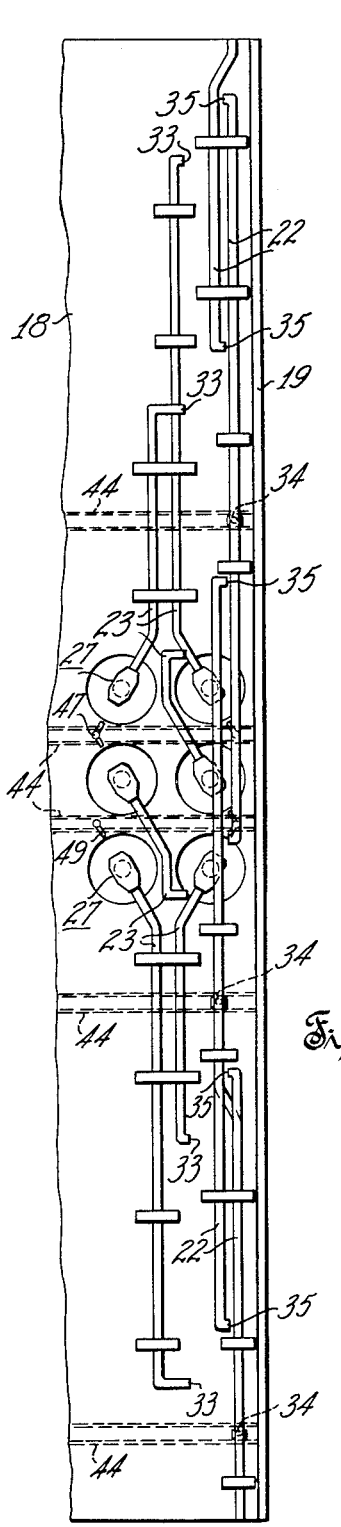
Fig. 4 is a development view of the annular portion of the dynamoelectric machine of Figs. 1 and 2 showing interphase and lead conductors and terminals for the armature winding of the machine.
Figure 5:
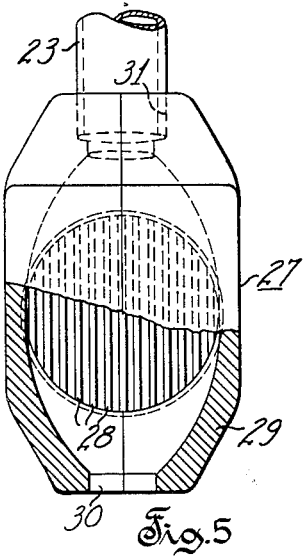
Fig. 5 is a plan view with a portion broken away and in section of the radiator end of a terminal bushing and taken along the line V—V of Fig. 1.
Figure 6:
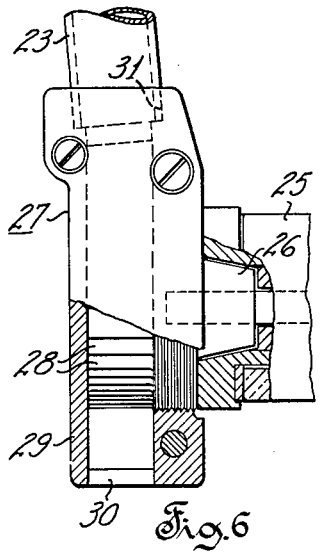
Fig. 6 is an end view with a portion broken away and in section of the radiator end of the bushing shown in Fig. 5.
Figure 7:
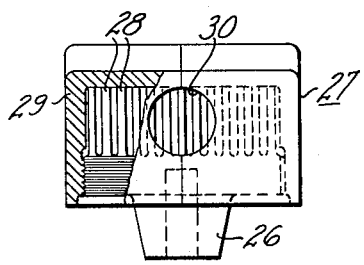
Fig. 7 is a front view with a portion broken away and in section of the radiator end of the bushing shown in Fig. 5.

Each coil group interphase conductor 22 is also hollow to provide a ventilating passage therein and has a gas inlet 34 spaced from a gas outlet 35 therein for receiving a flow of ventilating gas. As shown in Fig. 4, each such interphase conductor has gas outlets 35 at opposite ends thereof, and a single gas inlet 34 therein intermediate the gas outlets.

The gas inlets 30 for the radiator ends of the terminal bushings and the gas inlets for lead conductors and gas inlets for interphase conductors may be disposed in a high pressure chamber 41 within the machine housing and the gas outlets for the lead and interphase conductors disposed in a relatively low pressure chamber so that the pressure difference therebetween causes ventilating gas to flow in a path through the radiators and associated lead conductors and in a path through the interphase conductors. If the terminal bushings are located in the end of the housing having high pressure gas chamber 41, jet cooling is provided by enclosing the radiators in a separate housing, mounting jet pipes in this housing to direct free jets of ventilating gas to the radiator inlets from the high pressure chamber. Suitable ducts connect the separate housing to the low pressure gas chamber to maintain it at the relatively low pressure. As shown in Fig. 2, however, the interphase conductors 22, the lead conductors 23, the radiators 27 for the terminal bushings 25, and all the gas inlets as well as the gas outlets therefor are disposed in a relatively low pressure gas chamber 40 which is the end space between the cores and the blower 16. The intake of blower 16 is disposed in this low pressure chamber.

Relatively high pressure gas chamber 41 is the space adjacent the other ends of the stator and rotor cores. Ventilating gas discharged by the impeller of blower 16 flows through an annular diffuser 42 and associated volute into bayonet tube type coolers 43. These coolers are disposed outside of the housing 8 and extend longitudinally thereof. Opposite ends of the coolers are connected to opposite ends of housing 8 so that blower 16 forces ventilating gas therethrough to the relatively high pressure gas chamber 41 at the other end of the machine. From high pressure chamber 41 ventilating gas flows in parallel paths through the air gap and the axial passages provided in the stator core 11 and rotor core 10 and their windings back to the low pressure gas chamber 40 and to the blower 16.

Means are provided to bring ventilating gas from the relatively high pressure chamber 41 to supply ventilating gas under relatively high pressure to the gas inlets 30 of the bushings and gas inlets 34 of the interphase conductors in the relatively low pressure chamber 40. Such means comprises U-shaped channels 44 disposed longitudinally on the outer periphery of inner wrapper 18 to form therewith ducts 45 extending the length of the machine and closed at both ends by abutting rigid end rings 19, 20.

Apertures such as drilled holes 46 through inner wrapper 18 aligned with the U-shaped channels admit ventilating gas to these channel ducts 45 from high pressure gas chamber 41. At the blower end of the machine threaded holes 46 are similarly provided in inner wrapper 18 in alignment with ducts 45 formed by U-shaped channels 44. Jet means spaced from the gas inlets 30 of the radiators and inlets 34 of interphase conductors comprises short lengths of pipe 47, 48 threaded in holes 46 in blower end of wrapper 18. As shown in Figs. 1 and 4 pipes 47 which supply ventilating gas to the bushing radiators terminate in L-shaped and T-shaped couplings. A jet nozzle such as a pipe nipple 49 is secured in each of the two L-shaped couplings, and two such jet nozzles 49 are secured in each of two T-shaped couplings.

Ventilating gas supplied via channel ducts 45 from the high pressure gas chamber 41 is directed by these six jet nozzles 49 in the low pressure chamber as free jets of ventilating gas which flow across a portion of the low pressure chamber to enter the gas inlets 30 to the radiators. Each free jet of gas entering a radiator flows between the fins 28 thereof and then flows through the associated lead conductors 23 to discharge therefrom adjacent the winding. This ventilating gas absorbs heat from the radiator fins and from the lead conductor to increase the permissible current capacity of the conductor and bushing.

Jet pipes 48 connected to channel ducts 45 are disposed so they direct free jets of ventilating gas into the gas inlets 34 of the interphase conductors 22 to cause such ventilating gas to flow through the interphase conductors. Ventilating gas flows from each inlet 34 through the interphase conductor to the gas outlets 35 at opposite ends of the conductor and adjacent the windings.

While but one embodiment of the invention has been both shown and described, other embodiments or arrangements will be apparent to one skilled in the art without departing from the spirit of the invention or from the scope of the appended claims.

It is claimed and desired to secure by Letters Patent:

1. A gas cooled dynamoelectric machine comprising a gas tight housing, a relatively high pressure gas chamber within said housing, means forcing ventilating gas into said high pressure chamber from which ventilating gas is circulated through said machine, a radiator and a current conducting terminal inside said housing in good heat conducting relation to said radiator, said radiator comprising a plurality of closely spaced fins, and means spaced from said radiator directing a free jet of ventilating gas from said high pressure gas chamber between said fins of said radiator for cooling said current conducting terminal.

2. A gas cooled dynamoelectric machine comprising a gas tight housing, means creating a relatively high pressure gas chamber and a relatively low pressure gas chamber within said machine housing with ventilating gas circulated therebetween through said machine, a radiator disposed in one of said gas chambers, a current conducting terminal stud extending through said machine housing with the end inside said housing secured in good heat conducting relation to said radiator, said radiator comprising a plurality of closely spaced fins and a housing integral therewith enclosing said fins, a gas inlet to said radiator housing and a gas outlet therefrom, said outlet of said radiator housing opening to said relatively low pressure gas chamber within said machine housing, and means spaced from said radiator directing from said high pressure gas chamber a free jet of ventilating gas into said inlet of said radiator housing to cause said ventilating gas to cool said fins of said radiator and discharge through said radiator outlet to said low pressure gas chamber.

3. A gas cooled dynamoelectric machine comprising a gas tight housing, means creating a relatively high pressure gas chamber and a relatively low pressure gas chamber within said machine housing with ventilating gas circulated therebetween through said machine, a radiator disposed in said low pressure gas chamber, a current conducting terminal stud extending through said machine housing with the end inside said housing secured in good heat conducting relation to said radiator, said radiator comprising a plurality of closely spaced parallel fins and a housing integral therewith enclosing said fins, a gas inlet to said radiator housing and a gas outlet therefrom aligned with each other on opposite sides of said radiator housing parallel with said fins, said outlet of said radiator housing opening to said relatively low pressure gas chamber within said machine housing, and means spaced from said radiator directing from said high pressure gas chamber a free jet of ventilating gas through said low pressure gas chamber into said inlet of said radiator housing to cause said ventilating gas to flow between said fins of said radiator and discharge through said radiator outlet to said low pressure gas chamber.

4. A gas cooled dynamoelectric machine comprising a gas tight housing, means forcing ventilating gas into a relatively high pressure gas chamber within said housing at one end of said machine for circulation through said machine to a relatively low pressure gas chamber at the other end of said machine, a stator including an axially extending winding, interphase conductors in said low pressure gas chamber for said stator winding, said interphase conductors constructed and arranged to provide longitudinal ventilating ducts therein to bring ventilating gas in direct contact with the conductors, each interphase conductor having a gas outlet adjacent said stator winding and a gas inlet remote therefrom and in said low pressure gas chamber, means including discharge nozzles spaced from said gas inlets directing through said low pressure gas chamber free jets of ventilating gas supplied from said high pressure gas chamber into said inlets of said conductors to cause ventilating gas to flow through said interphase conductors.

5. A gas cooled dynamoelectric machine comprising a gas tight housing, means forcing ventilating gas into a relatively high pressure gas chamber within said housing at one end of said machine for circulation through said machine to a relatively low pressure gas chamber at the other end of said machine, a stator including an axially extending armature winding, lead conductors in said low pressure gas chamber for said stator winding and interphase conductors in said low pressure gas chamber interconnecting phase groups of said stator winding, said lead conductors and said interphase conductors constructed and arranged to provide longitudinal ventilating ducts therein to bring ventilating gas in direct contact with the conductors, each lead conductor and each interphase conductor having a gas outlet adjacent said stator winding and a gas inlet remote therefrom in said low pressure gas chamber, means including discharge nozzles spaced from said gas inlets directing through said low pressure gas chamber free jets of ventilating gas supplied from said high pressure gas chamber into said inlets of said conductors to cause ventilating gas to flow through said lead conductors and through said interphase conductors.

6. A gas cooled dynamoelectric machine comprising a gas tight housing, means forcing ventilating gas into a relatively high pressure gas chamber within said housing at one end of said machine for circulation through said machine, a stator including an axially extending winding, terminal bushings mounted in said housing at the other end of said machine, each said bushing including a current conducting stud extending through said housing with one end inside said housing in a relatively low pressure chamber therein, a gas cooled radiator secured in good heat conducting relation to said one end of said stud, said radiator comprising a plurality of parallel fins in said relatively low pressure chamber, hollow lead conductors connecting said winding to said terminal studs, each lead conductor having a gas outlet adjacent said winding and a gas inlet adjacent said terminal stud, means spaced from said bushing directing ventilating gas supplied from said high pressure chamber in a free jet through said low pressure chamber and between said fins of said radiator to cause ventilating gas to enter and flow through said lead conductor and discharge adjacent said winding for cooling said terminal stud and said lead conductor.

7. A gas cooled dynamoelectric machine comprising a tight housing, a stator including a winding and axial ventilating passages, a rotatable shaft, a rotor including a cylindrical field member mounted on said shaft and having axial ventilating passages, a cooler, a high pressure centrifugal blower mounted on said shaft at one end of said machine, said blower forcing ventilating gas in a path from said blower to said cooler, through said cooler to a high pressure gas chamber at the opposite end of said machine, from said high pressure gas chamber in parallel paths through said axial passages in said stator and rotor to a low pressure gas chamber at said one end of said machine adjacent said blower, a terminal bushing including a terminal stud mounted in said bushing with one end in said low pressure chamber, a gas cooled radiator in good heat conducting relation to said one end of said stud, said radiator comprising a plurality of heat radiating fins, duct means disposed to receive ventilating gas from said high pressure gas chamber and having discharge nozzles in said low pressure gas chamber, said discharge nozzles spaced from said radiator and disposed to direct a free jet of ventilating gas through said low pressure gas chamber between said fins of said radiator to cause ventilating gas to cool said fins and said terminal stud.

8. A gas cooled dynamoelectric machine comprising a gas tight housing, a stator including a polyphase armature winding and axial ventilating passages, a rotatable shaft, a rotor including a cylindrical field member mounted on said shaft and having axial ventilating passages, a cooler, a high pressure centrifugal blower mounted on said shaft at one end of said machine, said blower forcing ventilating gas in a path from said blower to said cooler, through said cooler to a high pressure gas chamber at the opposite end of said machine, from said high pressure gas chamber in parallel paths through said axial passages in said stator and rotor to a low pressure gas chamber at said one end of said machine adjacent said blower, a hollow lead conductor for said armature winding having a gas outlet adjacent its connection to said winding in said low pressure gas chamber and a gas inlet at the terminal end thereof in said low pressure gas chamber, duct means receiving ventilating gas from said high pressure gas chamber and having discharge nozzles in said low pressure gas chamber, said discharge nozzles being spaced from said lead conductor and disposed to direct a free jet of ventilating gas through said low pressure gas chamber into said inlet of said lead conductor to cause ventilating gas to flow therethrough and discharge from the outlet adjacent said winding.

9. A gas cooled dynamoelectric machine comprising a gas tight housing, stator including a polyphase armature winding and axial ventilating passages, a rotatable shaft, a rotor including a cylindrical field member mounted on said shaft and having axial ventilating passages, a cooler, a high pressure centrifugal blower mounted on said shaft at one end of said machine, said blower forcing ventilating gas in a path from said blower to said cooler, through said cooler to a high pressure gas chamber at the opposite end of said machine, from said high pressure gas chamber in parallel paths through said axial passages in said stator and rotor to a low pressure gas chamber at said one end of said machine adjacent said blower, a hollow lead conductor for said stator winding having a gas outlet adjacent said winding in said low pressure gas chamber and a gas inlet at the terminal end of said lead conductor, a terminal bushing extending through said housing with one end in said low pressure gas chamber, a terminal stud mounted in said bushing with one end connected to said lead conductor, a gas cooled radiator connected in good heat conducting relation to said one end of said stud, said radiator comprising a plurality of heat radiating fins and a radiator housing enclosing said fins, a gas inlet in said radiator housing and a gas outlet therein with said radiator inlet and the passages between said fins, said radiator outlet connected to said inlet of said lead conductor, and duct means disposed to receive ventilating gas from said high pressure gas chamber and having a discharge jet in said low pressure gas chamber, said discharge jet spaced from said radiator and disposed to direct a free jet of ventilating gas through said low pressure gas chamber into said inlet of said radiator to cause ventilating gas to flow therethrough between said fins and thence through said lead conductor and discharge therefrom at the outlet adjacent said winding.

10. A gas cooled dynamoelectric machine comprising a gas tight housing, a stator including a polyphase armature winding and axial ventilating passages, a rotatable shaft, a rotor including a cylindrical field member mounted on said shaft and having axial ventilating passages, a cooler, a high pressure centrifugal blower mounted on said shaft at one end of said machine, said blower forcing ventilating gas in a path from said blower to said cooler, through said cooler to a high pressure gas chamber at the opposite end of said machine, from said high pressure gas chamber in parallel paths through said axial passages in said stator and rotor to a low pressure gas chamber at said one end of said machine adjacent said blower, a hollow conductor interconnecting phase groups of said armature winding in said low pressure gas chamber, said hollow conductor having a gas outlet and a gas inlet, a hollow lead conductor for said armature winding having a gas outlet adjacent said winding in said low pressure gas chamber and a gas inlet to said lead conductor at the terminal end thereof, a terminal bushing extending through said housing with one end in said low pressure gas chamber, a terminal stud mounted in said bushing with one end connected to said lead conductor, a gas cooled radiator connected in good heat conducting relation to said one end of said stud, said radiator comprising a plurality of heat radiating fins and a radiator housing enclosing said fins, a gas inlet to said radiator housing and a gas outlet aligned with said gas inlet and with the passages between said fins, said inlet of said lead conductor being connected to the outlet of said radiator housing, duct means disposed to receive ventilating gas from said high pressure gas chamber and having discharge jets in said low pressure gas chamber, one of said discharge jets being spaced from said hollow interphase conductor and disposed to direct a free jet of ventilating gas through said low pressure gas chamber into said inlet of said hollow interphase conductor to cause ventilating gas to flow therethrough and discharge from said outlet thereof adjacent said windings, another of said discharge jets being spaced from said radiator and disposed to direct a free jet of ventilating gas through said low pressure gas chamber into said inlet of said radiator to cause ventilating gas to flow therethrough between said fins and thence through said lead conductor and discharge therefrom at the outlet adjacent said winding.

11. A gas cooled dynamoelectric machine comprising a gas tight housing, an electric winding for said machine having a lead conductor, a relatively high pressure gas chamber within said housing, means forcing ventilating gas into said high pressure chamber from which ventilating gas is circulated through said machine, a current conducting terminal extending through said housing and having an end in one of said gas chambers, a radiator on said end in good heat conducting relation therewith and electrically connecting said terminal and said lead conductor, said radiator comprising a plurality of closely spaced fins and a housing integral therewith enclosing said fins, a gas inlet to said radiator housing and a gas outlet therefrom, said outlet of said radiator housing opening to said relatively low pressure gas chamber within said machine housing, and means including discharge nozzles spaced from said radiator directing from said high pressure gas chamber free jets of ventilating gas into said inlet of said radiator housing to cause said ventliating gas to cool said fins of said radiator and discharge through said radiator outlet to said low pressure gas chamber.

References Cited in the file of this patent

UNITED STATES PATENTS

| 1,298,888 | Champion | Apr. 1, 1919 |
| 2,583,417 | Eitel | Jan. 22, 1952 |

FOREIGN PATENTS

| 823,490 | France | Oct. 18, 1937 |